United States Patent [19]

Goto

[11] Patent Number: 5,641,105

[45] Date of Patent: Jun. 24, 1997

[54] FIXING BOARD FOR USE IN ATTRACTION-FASTENING TYPE FREIGHT CARRYING DEVICE

[75] Inventor: Masumi Goto, Kariya, Japan

[73] Assignee: Autobacs Seven Co., Ltd., Osaka, Japan

[21] Appl. No.: 494,579

[22] Filed: Jun. 23, 1995

[30] Foreign Application Priority Data

Jun. 27, 1994 [JP] Japan .................... 6-144921

[51] Int. Cl.⁶ .................... B60R 9/00; B60R 9/04
[52] U.S. Cl. .................... 224/309; 224/315; 224/317; 224/324; 224/327; 224/548; 224/559; 224/562; 224/917.5
[58] Field of Search .................... 224/309, 315, 224/317, 318, 322, 323, 324, 327, 559, 548, 562, 917.5; 248/205.8, 205.9, 206.5

[56] References Cited

U.S. PATENT DOCUMENTS

| | | | |
|---|---|---|---|
| 3,111,735 | 11/1963 | Ellis | 24/201 |
| 4,747,526 | 5/1988 | Hinderaker et al. | 224/325 |
| 5,014,946 | 5/1991 | Gruber | 248/205.9 |
| 5,076,527 | 12/1991 | Yung-Huei | 248/362 |
| 5,192,043 | 3/1993 | Fa | 248/206.5 |

FOREIGN PATENT DOCUMENTS

| | | |
|---|---|---|
| 32 21 126 A1 | 12/1983 | Germany . |
| 0 558 992 A1 | 9/1993 | Italy . |
| 3-042446 | 4/1991 | Japan . |
| 0 587 025 A1 | 3/1994 | Japan . |
| 0 597 251 A1 | 5/1994 | Rep. of Korea . |

OTHER PUBLICATIONS

Patent Abstracts of Japan, vol. 12, No. 149, May. '88, abstracting JP 62–268 751 of Nov. '87.
Derwent WPI Abstract of Uebach/Erblein & Co. DE 32 21 126 A1, pub. Dec. '83.

*Primary Examiner*—Henry J. Recla
*Assistant Examiner*—Timothy L. Maust
*Attorney, Agent, or Firm*—David G. Conlin; Milton Oliver

[57] ABSTRACT

A fixing board, for an attraction-fastening type freight carrying device to be mounted on the roof of a motor vehicle, has been improved. The fixing board is composed of a magnetic attraction force contact plate, a film-like suction-cup, and a releasing handle. The magnetic attraction force contact plate has a three-layer structure comprising a soft magnet plate, an iron plate and smooth thin-film sheet coated on the iron plate. The iron plate has a plurality of grooves radially extending, which are elongated dead-end grooves. Further, the magnetic attraction force contact plate has a through-hole into which a substantially cylindrical seal lip extending from the suction film is inserted so as to make an air value. This air hole takes on a closed state when the freight carrying device is installed on the vehicle roof, and takes on an open state when being removed therefrom. The film-like suction-cup is formed throughout the circumference of the magnetic attraction force contact plate.

8 Claims, 7 Drawing Sheets ically attracted onto the outside surface of the vehicle roof. As shown in FIGS. 1 to 3 of the present application, such a conventional ski carrier is provided with a magnetic base section 101 magnetically attracted onto a roof R of a car A and having a hooked portion 101A for removal at an appropriate portion of its peripheral edge section. A semi-cylindrical block 102 is integrally attached to a central portion of the upper surface of the magnetic base section 101 and a ski supporting plate 105 is rotatably and elevatably fit onto the block 102 through a pair of right- and left-hand pedestals 104 rotatable in the forward and backward directions of the car body with a rotary shaft being rotated about its rotational center between a falling-down position and a standing-up position with respect to the block 102. For use, the ski supporting plate 105 is held to take the standing-up position and ski plates 106 are fitted into a pair of right- and left-hand ski fitting grooves 105A formed in the ski supporting plate 105. During the use, the ski supporting plate 105 lowers chiefly by the load of the ski plates 106 to come into a surely engaged condition with the ski plates 106 at a state in which the ski supporting plate 105 is kept in its standing-up position. When being lifted to be released from this engaged condition, the ski supporting plate 105 can be fallen down.

FIXING BOARD FOR USE IN ATTRACTION-FASTENING TYPE FREIGHT CARRYING DEVICE

BACKGROUND OF THE INVENTION

1. Field of the Invention

The present invention relates to a fixing board for an attraction-fastening type freight carrying device which is directly attachable onto a roof of a motor vehicle and others to allow freight, such as skis, to be fixed thereon.

2. Description of the Prior Art

As one example of ski carriers for motor vehicles being mounted on roofs thereof in order to carry elongated articles, such as skis, by the vehicles, the Japanese Utility Model Laid-Open Hei 3 No.42446 discloses, WADA a ski carrier which is equipped with a magnetic base section magnetically attracted onto the outside surface of the vehicle roof. As shown in FIGS. 1 to 3 of the present application, such a conventional ski carrier is provided with a magnetic base section 101 magnetically attracted onto a roof R of a car A and having a hooked portion 101A for removal at an appropriate portion of its peripheral edge section. A semi-cylindrical block 102 is integrally attached to a central portion of the upper surface of the magnetic base section 101 and a ski supporting plate 105 is rotatably and elevatably fit onto the block 102 through a pair of right- and left-hand pedestals 104 rotatable in the forward and backward directions of the car body with a rotary shaft being rotated about its rotational center between a falling-down position and a standing-up position with respect to the block 102. For use, the ski supporting plate 105 is held to take the standing-up position and ski plates 106 are fitted into a pair of right- and left-hand ski fitting grooves 105A formed in the ski supporting plate 105. During the use, the ski supporting plate 105 lowers chiefly by the load of the ski plates 106 to come into a surely engaged condition with the ski plates 106 at a state in which the ski supporting plate 105 is kept in its standing-up position. When being lifted to be released from this engaged condition, the ski supporting plate 105 can be fallen down.

However, in a prior ski roof-carrier, the attachment of the ski plates 106 to the ski supporting plate 105 is made such that, after the ski plates 106 are fitted in the ski fitting grooves 105A, a rubber band (not shown) is wound around the ski plates 106 and hooked by rubber band hooking portions 129. On the other hand, the removal of the ski plates 106 is accomplished by the untying of the rubber band therefrom. Accordingly, the attachment and removal of the ski plates 106 are troublesome and detract from its workability. In addition, the magnetic base section 101 is structurally integrated fixedly with a metallic flat plate 111a and a magnet base plate such as a rubber magnet 111b, while the car roof R has a number of curved surfaces, for which reason, to tightly fit and fix the FIGS. 1 to 3 ski carrier onto the roof R, there is a need for the metallic flat plate 111a of the magnetic base section 101 being flexible to follow the curved surfaces of the roof R so that the magnet base plate 111b is brought closely into uniform contact therewith throughout. There is a problem which arises with such an structure, however, in that difficulty is encountered to make the metallic flat plate 111a, as shown in FIGS. 1 and 2, freely curved to the curved surfaces of the roof R, since the metallic flat plate 111a usually has a great rigidity.

Various other ski carriers based on the same concept have heretofore been proposed, as exemplified by U.S. Pat. No. 4,747,529 HINDERAKER which discloses a collapsible ski rack set as shown in FIGS. 4 and 5. In the illustrations, onto a roof 116 of a car 118 there is fixedly secured a set of racks 110 comprising front and rear side racks 112 and 114 to, as shown in FIG. 4, hold ski plates 120 thereon. For example, the one rack 112 is constructed such that, as shown in FIG. 5, a mild steel made base plate 122 and a plastic magnet (or the like) made fixing means 124 are adhered to each other and a holding mechanism 126 is vertically set thereon. The FIG. 5 structure includes arms 134, 136 and a leg 132 and the end portion of the leg 132 serving as a supporting portion 130 is rotatably supported by a clip 128 which in turn, is welded to the base plate 122. As to the other rack 114 in FIG. 4, reference numeral 138 represents a base plate (the same as 122), numerals 150, 156 denote arms, and numeral 148 indicates a leg.

As well as the FIGS. 1 to 3 ski carrier, this ski rack structure also has a disadvantage in that difficulty is experienced to follow the curvatures of the roof 116 of the car 118, thus not eliminating the problems.

Moreover, as generally known, the board for fixing freight such as a ski onto a roof of a motor vehicle employs a structure in which it is attached through metallic fittings to projections such as gutters at both sides of the roof, with the result that it is necessary needed to additionally use metallic fittings.

SUMMARY OF THE INVENTION

The present invention has been developed in consideration of the above-mentioned problems, and it is therefore an object of this invention to provide a fixing board for an attraction-fastening type freight carrying device which is readily flexible to curved surfaces of a roof of a motor vehicle such as a car to stably and uniformly come closely into contact with the roof thereof, concurrently with being capable of directly sticking to the roof thereof without the use of any metallic fitting.

To achieve the foregoing purpose, a first feature of this invention provides is providing a fixing board for an attraction-fastening type freight carrying device wherein a grooved configuration is formed in a magnetic attraction force contact plate to allow the magnetic attraction force contact plate to be deformable when its magnetic force acts upon the roof of a car to allow the fixed board to come into tight contact therewith.

A second feature of this invention is to provide a fixing board for an attraction-fastening type freight carrying device wherein a grooved configuration is formed in a magnetic attraction force contact plate so that the magnetic attraction force contact plate is deformable by its own magnetic attraction force when coming into contact with the roof, the grooved configuration including a plurality of dead-end grooves radially extending.

In these features, the magnetic attraction force contact plate has at least a two-layer structure comprising a soft magnet plate and a ferromagnetic plate adhered thereto, the grooved configuration being effective when being formed on the ferromagnetic plate.

A third point of this invention is providing a fixing board for an attraction-fastening type freight carrying device which is equipped with a magnetic attraction force contact plate, a film-like suction-cup placed throughout the circumferential section of the magnetic attraction force contact plate and an air valve fitted onto the magnetic attraction force contact plate.

A fourth point of this invention is to provide a fixing board for an attraction-fastening type freight carrying device which is equipped with a magnetic attraction force contact plate, a film-like suction-cup placed throughout the peripheral section of the magnetic attraction force contact plate and an air valve fitted onto the magnetic attraction force contact plate, the magnetic attraction force contact plate having a grooved configuration which makes the magnetic attraction force contact plate deformable due to the function of its own magnetic attraction force, and the air valve being composed of an air hole made in the magnetic attraction force contact plate and a valve body permitting the opening and closing of the air hole, which valve body is operative in connection with a releasable handle (lever). Here, it is appropriate that the fixing board has one of the magnetic attraction force contact plate with grooved configuration and the air valve, where the both may be included.

In the third and fourth points, it is effective that the film-like suction-cup comprises a plurality of tongue-shaped pieces placed along the circumference of its suction surface and that a contact surface of the magnetic attraction force contact plate is coated with a thin-film sheet.

In the above-mentioned fixing board for an attraction-fastening type freight carrying device according to this invention, irrespective of the roof of a motor vehicle being generally formed to have a convex shape, the groove of the magnetic attraction force contact plate easily deforms the magnetic attraction force contact plate when a magnetic attraction force acts upon the roof, whereby the magnetic attraction force contact plate readily comes into complete and tight contact with the roof, thus improving the attraction-fastening force of the magnetic attraction force contact plate, with the result that the freight carrying device can directly be attached onto the roof without the use of metallic fittings unlike the prior art.

In addition, In the above-mentioned fixing board for an attraction-fastening type freight carrying device according to this invention, when the freight carrying device is installed on a car roof, portions between the adjacent dead-end grooves of a plurality of grooves formed radially tend to stretch in conformity with the convex-shaped roof, while the plurality of grooves absorb, or compensate for, the stretches. Accordingly, the magnetic attraction force contact plate becomes easily deformable in conformity with the roof shape to wholly come into contact therewith.

Furthermore, in the fixing board for an attraction-fastening type freight carrying device according to this invention, the ferromagnetic plate increases its attraction force, thereby increasing the attraction force of the magnetic attraction force contact plate.

Moreover, in the fixing board for an attraction-fastening type freight carrying device according to this invention, the film-like suction-cup serves as a suction cup when the air valve is set to the closed state, and the negative pressure permits the fixing board to be fastened onto the roof. Further, even if the attraction-fastening type freight carrying device violently moves up and down on the roof, the film-like suction-cup functions as a check valve so as to maintain the negative pressure within the suction cup. Although the magnetic attraction force contact plate is fastened onto the roof through its magnetic attraction force when the attraction-fastening type freight carrying device is fitted onto the roof, at this time a pressure is applied to air within the suction cup, whereby the pressurized air lets off the tightly contacting condition between the suction cup and the roof to drive out the air within the suction cup to the exterior so that the negative pressure within the suction cup increases. In addition, the magnetic attraction force contact plate simultaneously causes the fastening of the fixing board onto the roof.

As described above, according to this invention, the fixing board is strongly fastened mainly by means of the negative pressure due to the film-like suction-cup while the attraction force is increased or maintained by the magnetic attraction force contact plate together with the negative pressure, whereupon the freight carrying device can directly be attached onto the roof without the use of any metallic fitting unlike the prior art does.

Furthermore, in the fixing board for an attraction-fastening type freight carrying device, when the freight carrying device is on the roof, the valve body makes the air hole in the closed state to maintain the negative pressure within the suction cup. On the other hand, when the freight carrying device is removed therefrom, the valve body releases the air hole through the manual operation of the releasing handle to cause the negative pressure within the suction cup to be released to the atmosphere. The releasing handle is a manual handle for removing the freight carrying device from the roof.

Thus, according to this invention, in the fixing board for an attraction-fastening type freight carrying device, the releasing of the negative pressure within the suction cup to the atmosphere permits the easy removal of the freight carrying device from the roof. In addition, a series of operations of the releasing handle can simultaneously perform both the releasing of the negative pressure to the atmosphere and the removal of the freight carrying device, whereby the operability improves.

Moreover, according to this invention, in the fixing board for an attraction-fastening type freight carrying device, as described before, the grooves allow the easy conformation of the magnetic attraction force contact plate to the roof so that the magnetic attraction force contact plate entirely comes into contact therewith, and therefore the remaining air within the suction cup decreases, thus enhancing the fastening force.

Still further, according to the fixing board for an attraction-fastening type freight carrying device which has connections with this invention, the plurality of tongue-shaped pieces include inner tongue-shaped pieces and outer tongue-shaped pieces formed along the circumference of the suction surface of the film-like suction-cup so that the inner tongue-shaped pieces prevents the leakage of the negative pressure from within the suction cup even if damage to the outer tongue-shaped pieces occurs, thereby maintaining the negative pressure within the suction cup for a long time.

Finally, according to this invention, the fixing board for an attraction-fastening type freight carrying device employs a smooth thin-film sheet whereby it is possible to reduce the remaining air within the suction cup to enhance the suction force.

DESCRIPTION OF THE PREFERRED EMBODIMENTS

An embodiment of the present invention will be described hereinbelow with reference to the drawings.

Figure 1:
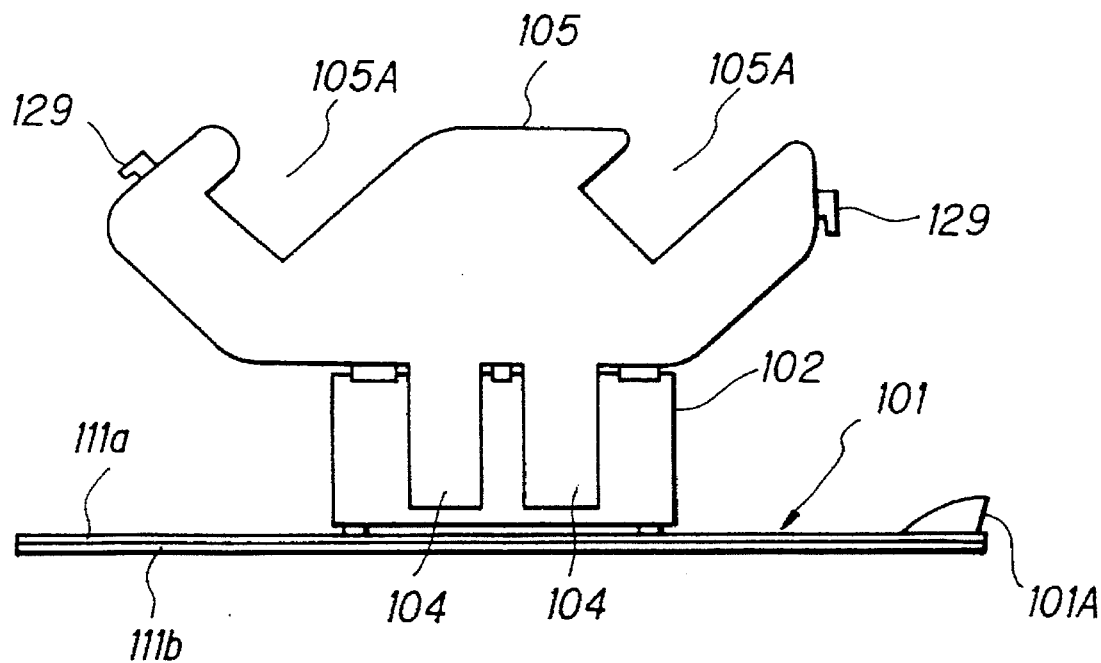
FIG. 1 is a front view showing an example of a conventional roof-carrier for motor vehicles.
Figure 2:
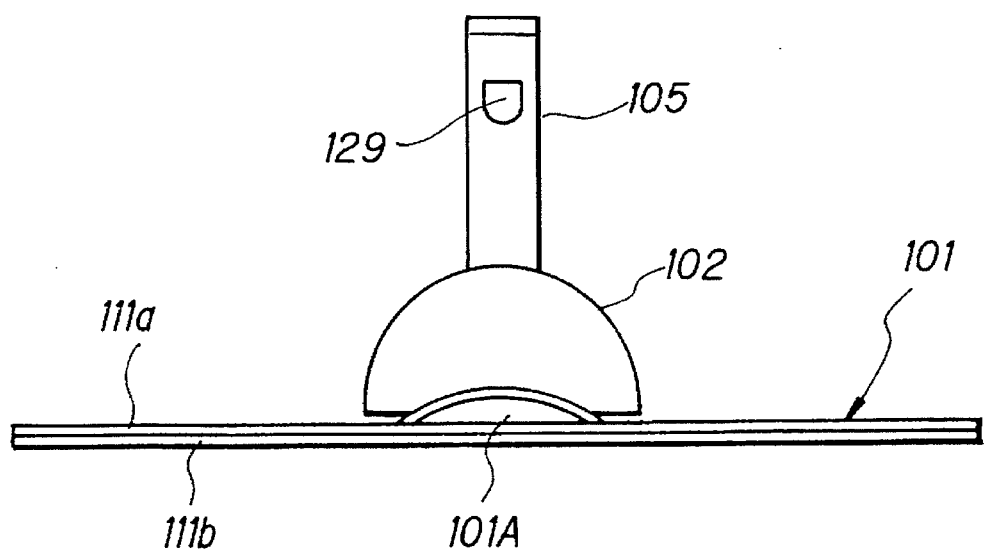
FIG. 2 is a right-side view showing the carrier in FIG. 1.
Figure 3:
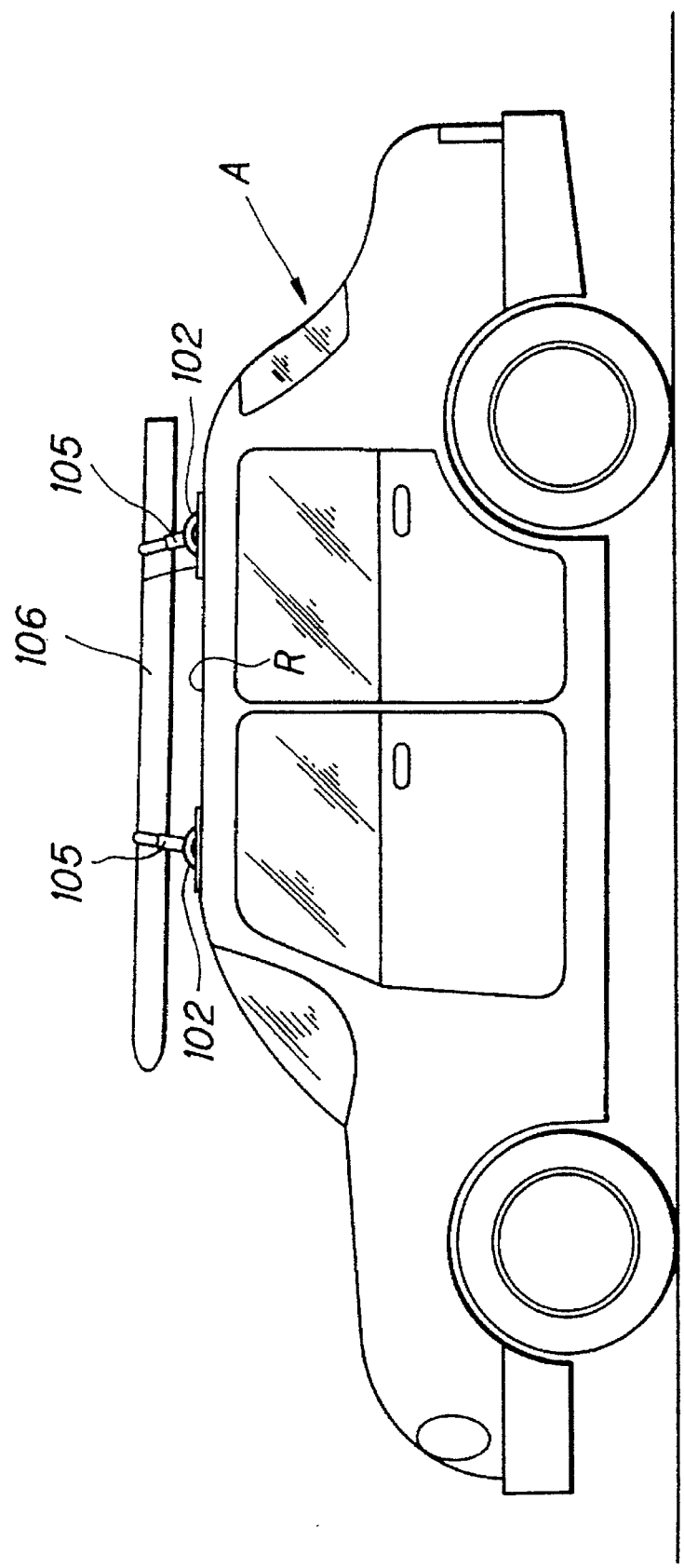
FIG. 3 is a side view showing the carrier in FIG. 1 which is in use.
Figure 4:
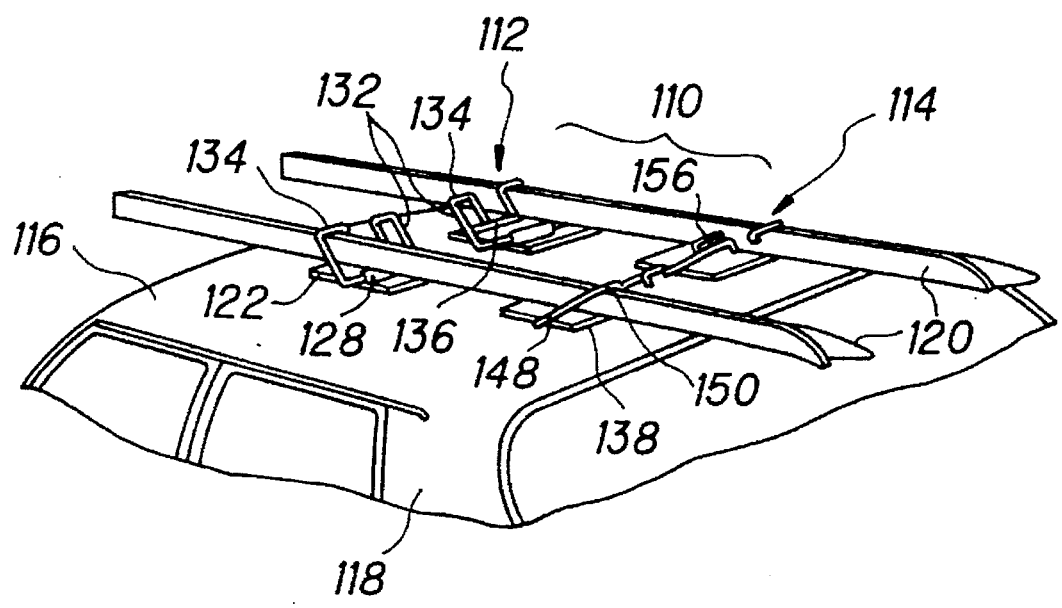
FIG. 4 is a perspective view showing another conventional motor vehicle roof-carrier which is in use.
Figure 5:
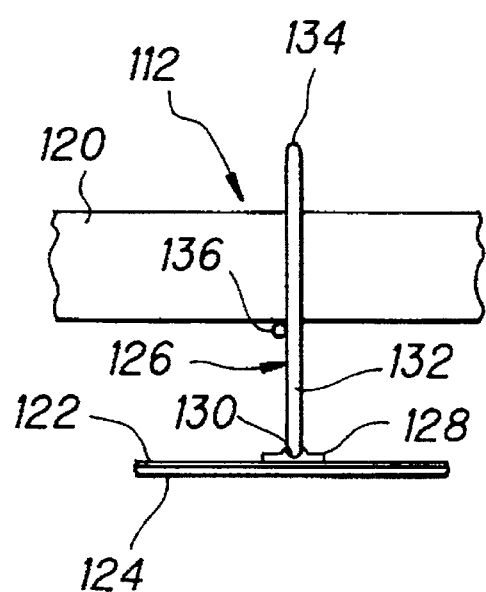
FIG. 5 is a side view showing racks for the roof-carrier in FIG. 4.
Figure 6:
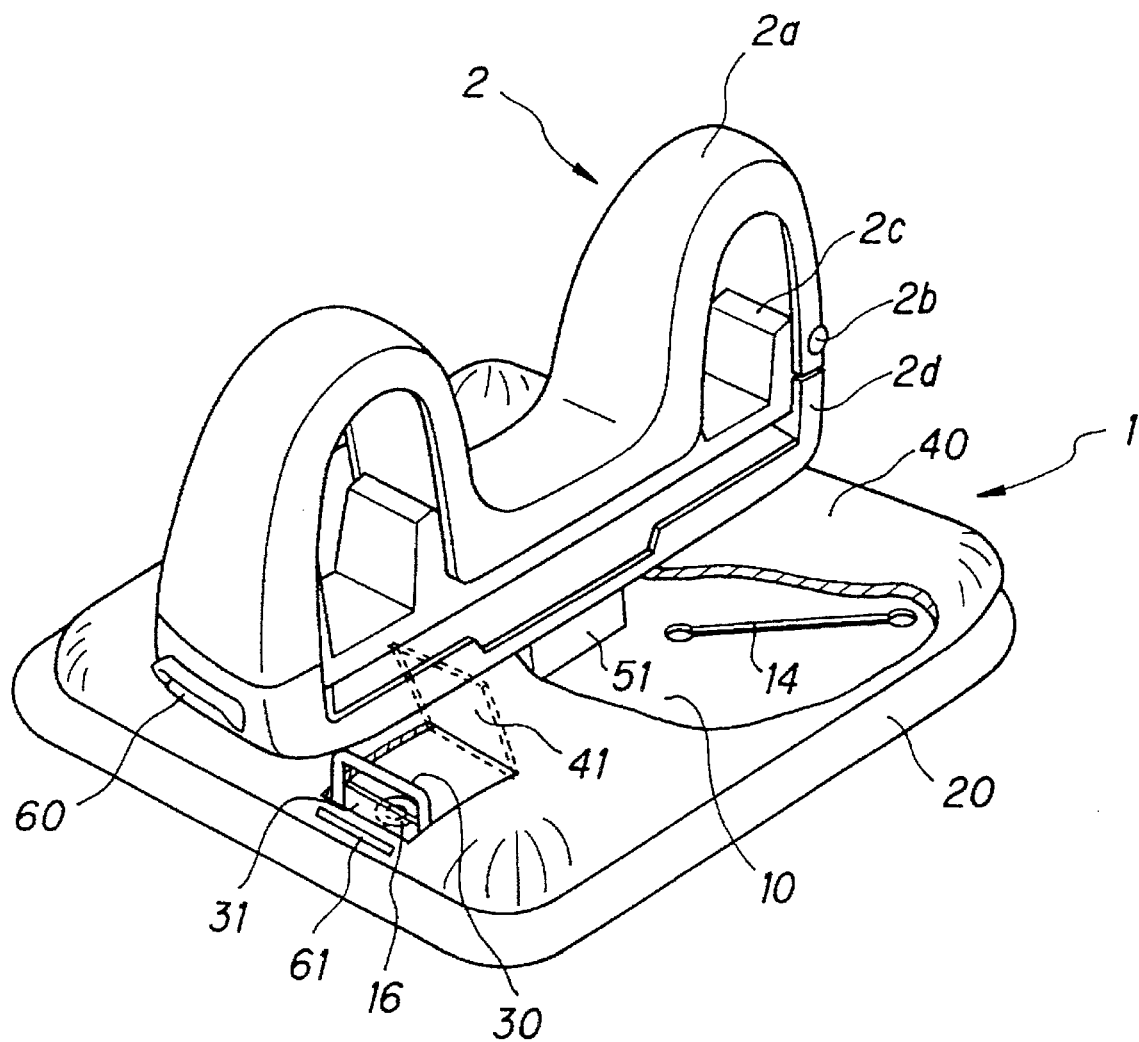
FIG. 6 is a perspective view, with portions broken away, showing a fixing board for an attraction-fastening type freight carrying device according to an embodiment of this invention.
Figure 7:
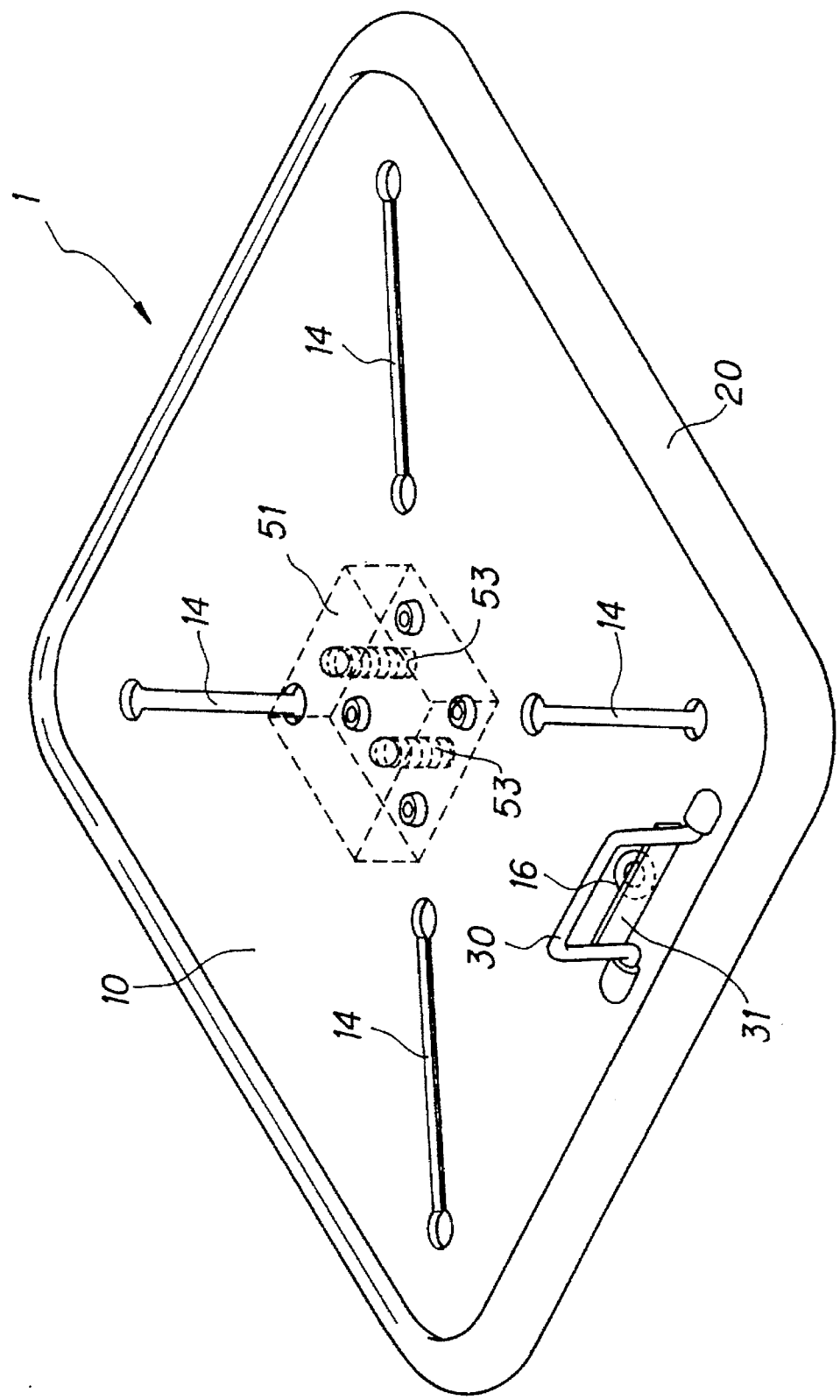
FIG. 7 is a perspective view showing the fixing board illustrated in FIG. 6.
Figure 8:
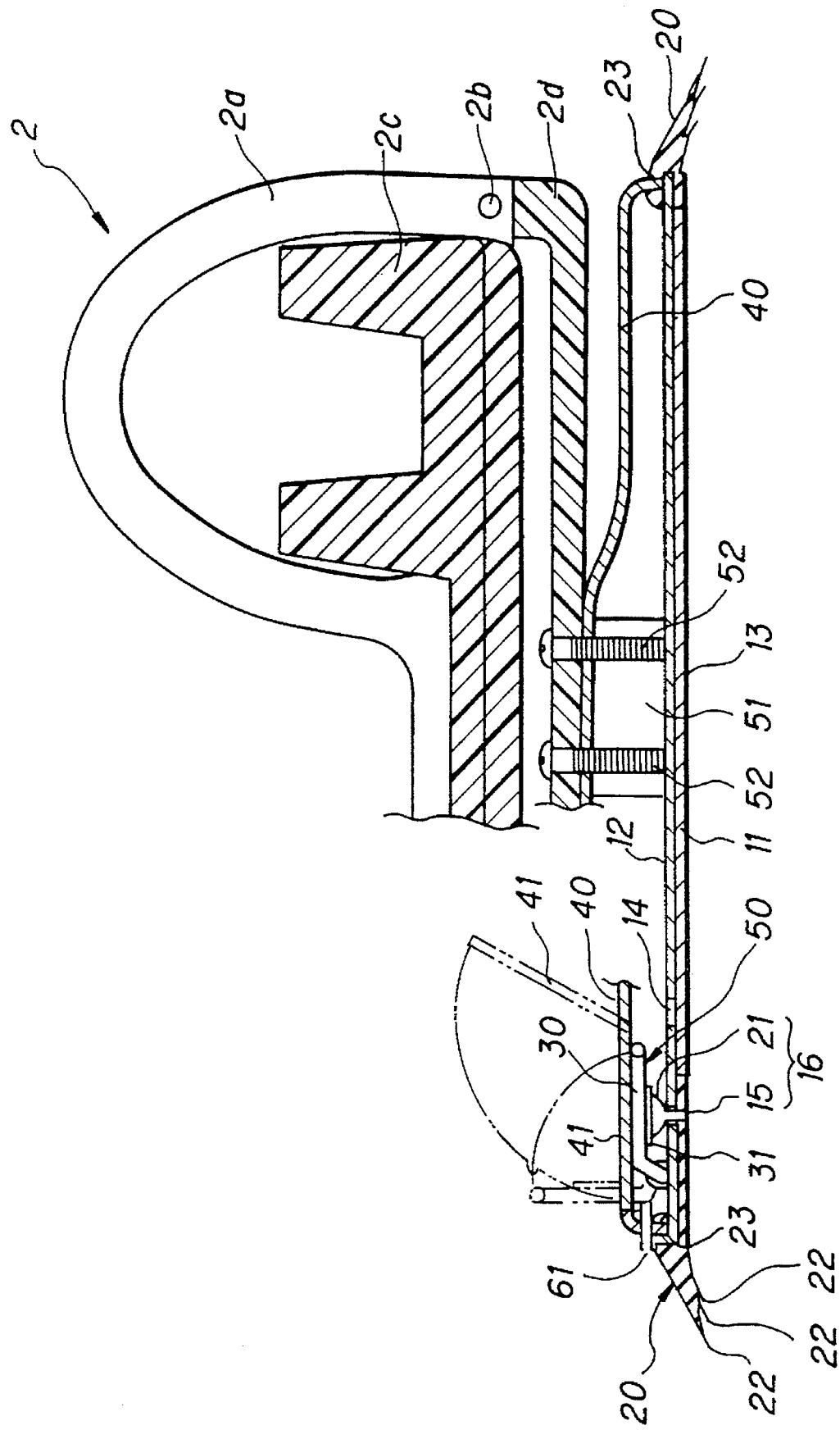
FIG. 8 is a view, partially in cross section, schematically illustrating the arrangements of the fixing board and a freight carrying member in FIG. 6.

In the drawings, FIG. 6 is a perspective view, with portions broken away, showing a fixing board for an attraction-fastening type freight carrying device according to the embodiment of this invention, FIG. 7 is a perspective view showing the fixing board of FIG. 6, and FIG. 8 is a view partially in cross section, schematically illustrating the arrangements of the fixing board and a freight carrying member in FIG. 6.

As shown in these figures, an attraction-fastening type freight carrying device basically comprises a fixing board 1 fastened and fitted onto a roof of a car or the like, and a freight carrying member 2 made to hold, or fix, freight, such as a ski. This freight carrying member 2 is divided into upper and lower halves, the upper half making up an opening and closing section 2a and the lower half constituting a fixed section 2d. A respective end of each of sections 2aa, 2d is joined to the other with a hinge section 2b so that the section 2a is rotatable relative to the section 2d. The freight carrying member 2 is further equipped with a freight fitting section 2c at the fixed section 2d which is designed to hold a freight item, such as a ski, while the opening and closing section 2a assume the closed state. In FIG. 6, reference numeral 60 designates a key hole which accepts a card key or the like for the opening and closing of the opening and closing section 2a.

On the other hand, the fixing board 1, as shown in FIGS. 6 to 8, serves as a means to closely attach the freight carrying device onto a roof of a car or the like, and is provided with a magnetic attraction force contact plate 10 and a film-like suction-cup 20 which will be described later. Further, the upper surface of the fixing board 1 is entirely covered with a case 40 having a case lid 41 openable and closable to operate, or raise, a releasing handle 30. In this case, a case fitting groove 23 is formed throughout in a circumferential portion of the film-like suction-cup 20, and the lower end portion of the case 40 is fitted in the groove 23.

Preferably, the magnetic attraction force contact plate 10, as shown in the cross section of FIG. 8, has a structure of at least two layers, in which a ferromagnetic plate such as an iron plate 12 is adhered onto a soft magnet plate such as a rubber magnet sheet 11. It is more effective to additionally coat a smooth thin-film sheet 13 on the adhesive surface of the magnet plate 11, in which three-layer structure case the ferromagnetic plate 12 enhances the magnetic attraction force and the thin-film sheet 13 guards the magnet plate 11 and the surface of the roof of the car or the like, as well as improves the contactability therebetween.

In the ferromagnetic plate 12 there are formed a plurality of grooves 14 extending radially. For example, these grooves 14, as shown in FIG. 7, are elongated dead-end grooves which, when the attraction-fastening type freight carrying device is mounted on a convex roof, are deformable in conformity with the shape of the roof to allow the magnetic attraction force contact plate 10 to entirely come into contact therewith. In the case where the grooves 14 are radially extending dead-end grooves, as shown in FIG. 7, a portion between the grooves 14 adjacent to each other tends to stretch in conformity with the convex shape of the roof, while the grooves 14 can absorb, or compensate for, the stretch thereof. Accordingly, the plurality of dead-end grooves 14 radially arranged permit the entire contact of the magnetic attraction force contact plate 10 with the roof. The grooves 14 are not limited to the number and shape shown in FIG. 7, and it is also possible to additionally provide a new dead-end groove 14 between the adjacent grooves 14. Further, it is also appropriate that the width of the grooves 14 is made to become larger gradually toward the outside. A feature of this invention is to provide the grooves 14 in the magnetic attraction force contact plate 10 as shown in FIG. 7, which can sharply improve the contactability of the fixing board 1 with the car roof with an extremely simple structure.

Moreover, in the magnetic attraction force contact plate 10 there is formed a through-hole 15 into which a substantially cylindrical seal lip 21 extending from the film-like suction-cup 20 is inserted, thereby forming an air hole 16. When the freight carrying device is on the roof, this air hole 16 takes the closed state by means of a valve body 31 provided on the releasing handle 30, and when removed therefrom, it enters into the open state.

The film-like suction-cup 20 is provided throughout the circumference of the magnetic attraction force contact plate 10. As illustrated in FIG. 8, the film-like suction-cup 20 has a plurality of tongue-shaped pieces 22 on its attraction-fastening surface which include the inner tongue-shaped pieces 22 and the outer tongue-shaped pieces 22, whereby the inner tongue-shaped pieces 22 can prevent the leakage of air from within a suction cup, which will be described later, and maintain the negative pressure even if the outer tongue-shaped pieces 22 become damaged.

The releasing handle 30 is operated when the freight carrying device is removed from the roof. When the freight carrying device is on the roof, the releasing handle 30 is pressed downwardly by the case lid 41 of the case 40 which is in the closed state, thereby strongly pressing the valve body 31 against the air hole 16 to keep the air hole 16 in the closed state. On the other hand, for the removal of the freight carrying device, the releasing handle 30 is rotated upwardly by a spring due to the opening of the case lid 41 so that the valve body 31 is separated from the air hole 16 to release the air hole 16. The air hole 16 and the valve body 31 make up an air valve 50. In this case, it is preferable that, as shown in FIGS. 6 and 9, in the case 40 there is made a key hole 61 which accepts a card key or the like to allow the case lid 41 to be openable.

Figure 9:
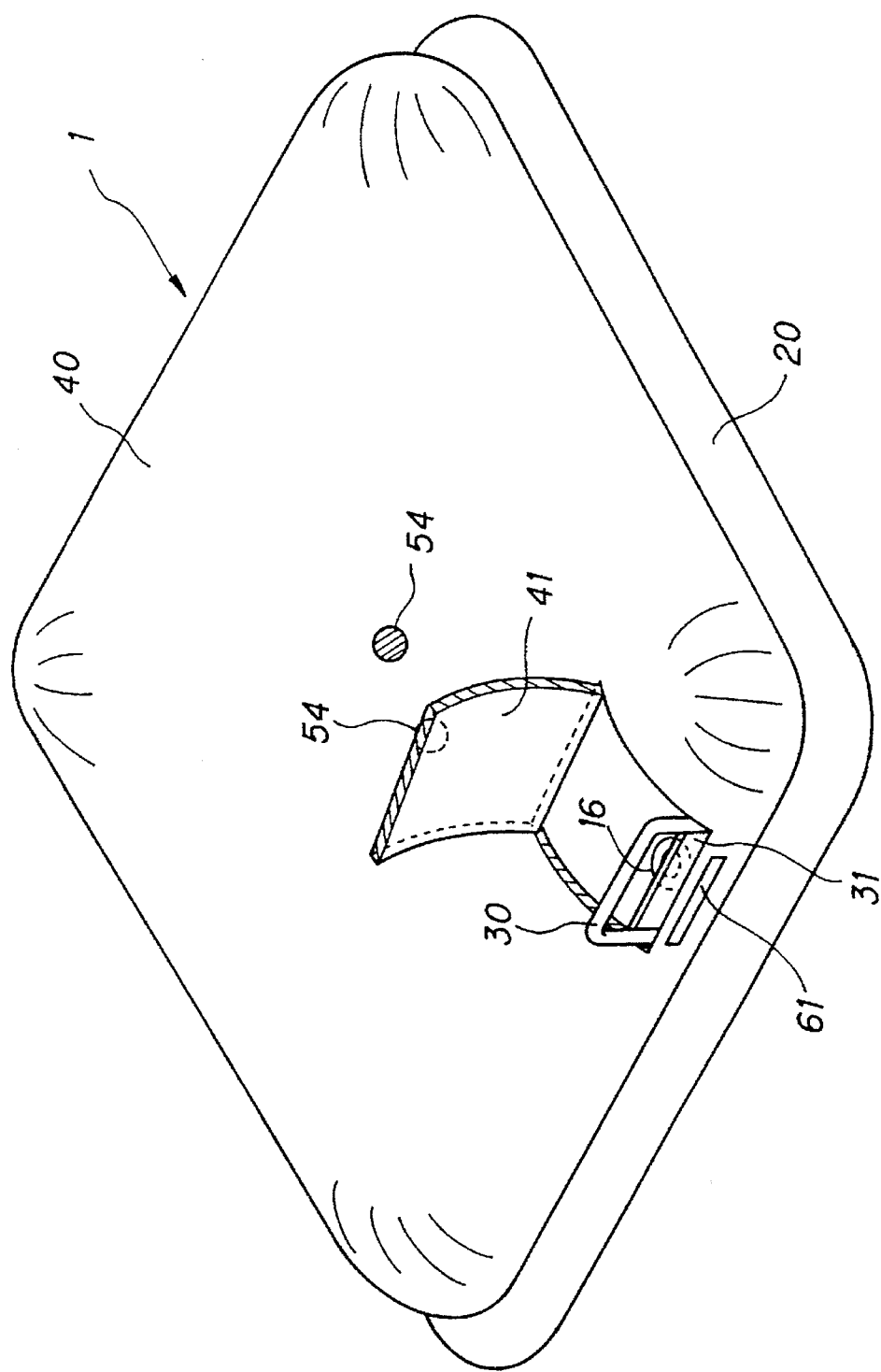
FIG. 9 is a perspective view showing a state in which a case covers the fixing board in FIG. 7.

As means to fit the freight carrying member 2 on the fixing board 1, as illustrated in FIGS. 7 to 9, a fitting base 51 with tapped holes 53 is fixedly secured in advance to the magnetic attraction force contact plate 10 in an appropriate way, and screws 52 are inserted through the bottom surface side of the fixed section 2d of the freight carrying member 2 via screw inserting holes 54 of the case 40 into the tapped holes 53 to screw on the freight carrying member 2.

The operation of the attraction-fastening type freight carrying device thus arranged will be described hereinbelow with reference to the drawings.

First, for the installation of the freight carrying device on the roof, the releasing handle 30 is pressed by the closing case lid 41 to cause the valve body 31 to be pressed downward against the air hole 16, with the result that the air valve 50 comes into the closed state (a state as shown by a solid line in FIG. 8). For this reason, the magnetic attraction force contact plate 10 and the film-like suction-cup 20 define a suction cup which generates a negative pressure when the freight carrying device is placed on the roof. The negative pressure causes the fixing board 1 to be fastened onto the roof. In installation, the magnetic attraction force contact plate 10 is fastened by means of its magnetic attraction force, while the air within the suction cup is pressurized at this time so that the pressurized air causes the film-like suction-cup 20 to be released from the contact condition with the roof and the air escapes therefrom to the exterior to enhance the negative pressure within the suction cup. The fixing board 1 is fastened onto the roof by means of the attraction-fastening force due to the magnetic attraction force of the magnetic attraction force contact plate 10 in addition to the attraction-fastening force chiefly caused by the negative pressure within the suction cup.

When the magnetic attraction force plate 10 is fastened onto the roof, the portions between the adjacent ones of the plurality of dead-end grooves 14 radially arranged tend to stretch in conformity of the convex shape of the roof, while the plurality of dead-end grooves 14 absorb the stretches. Accordingly, the magnetic attraction force contact plate 10 is easily deformable in conformity with the configuration of the roof so as to be wholly brought closely into contact with the roof. The smooth thin-film sheet 13 can reduce the remaining air within the suction cup by its smoothness, thereby improving the contactability therebetween.

In the case where the freight carrying device violently moves up and down on the roof during use, the film-like suction-cup 20 serves as a check valve to maintain the negative pressure within the suction cup.

In the removal of the freight carrying device from the roof, the case lid 41 is opened, whereupon the releasing handle 30 is rotated upwardly by a spring to permit the valve body 31 to be away from the air hole 16 to release the air valve 50, thus causing the negative pressure within the suction cup to be discharged to the atmosphere (a state as shown by a two-dot chain line in FIG. 8). Accordingly, the attraction-fastening force to the fixing board 1 is developed by only the magnetic attraction force of the magnetic attraction force contact plate 10, whereby the fixing board 1 is removable from the roof with relative ease by means of the operation of the releasing handle 30.

As is apparent from the above description, according to this embodiment, the fixing board 1 for an attraction-fastening type freight carrying device can be strongly fastened chiefly through the negative pressure due to the film-like suction-cup 20. Since this negative pressure is increased and maintained by the magnetic attraction force contact plate 10, it is possible to directly attach the freight carrying device onto the roof without the use of the metallic fittings as used in the prior art.

In addition, with the negative pressure within the suction cup being discharged to the atmosphere by means of the air valve 50, it is possible to remove the freight carrying device from the roof with relative ease. Moreover, a series of manual operations of the releasing handle 30 allows both the releasing of the negative pressure to the atmosphere and the removal of the freight carrying device to be simultaneously, thus providing an excellent operativity.

Furthermore, since the grooves 14 permit the magnetic attraction force contact plate 10 to be easily deformable in the conformity of the roof to wholly come into contact with the roof, the remaining air within the suction cup decreases and the attraction-fastening force increases. In addition, since the plurality of tongue-shaped pieces are formed along the circumference of the attraction-fastening surface of the film-like suction-cup 20, even if the outer tongue-shaped pieces 22 become damaged, the inner tongue-shaped pieces 22 can prevent the leakage of the negative pressure from within the suction cup, thereby maintaining the negative pressure within the suction-cup for a long time. Still further, the provision of the smooth thin-film sheet 13 can reduce the remaining air within the suction cup so as to enhance the fastening force.

It should be understood that the foregoing relates to only a preferred embodiment of the invention, and that it is intended to cover all changes and modifications of the embodiment of the invention herein used for the purpose of the disclosure, which do not constitute departures from the spirit and scope of the invention. For example, although this embodiment includes the film-like suction-cup 20, it is also possible to omit the film-like suction-cup 20. In this case, the attraction-fastening force relies on only the magnetic attraction force of the magnetic attraction force contact plate 10.

What is claimed is:

1. A fixing board for an attraction-fastening-type freight-carrying device to be mounted on an object, comprising
    a magnetic-attraction-force contract plate, for generating a magnetic attraction force, said plate being fastenable onto said object,
    said magnetic-attraction-force contact plate being formed with at least one groove, thereby allowing said contact plate to deform when said magnetic attraction force acts upon said object and thereby fastens said fixing board onto said object,
    wherein said magnetic-attraction-force contact plate has a structure of at least two layers, namely
    a soft magnet plate and
    a ferromagnetic plate adhered onto said soft magnet plate, said groove being formed in said ferromagnetic plate.

2. A fixing board for an attraction-fastening-type freight-carrying device to be mounted on an object, comprising
    a magnetic-attraction-force contract plate, for generating a magnetic attraction force, said plate being fastenable onto said object,
    said magnetic-attraction-force contact plate being formed with a plurality of grooves, thereby allowing said contact plate to deform when said magnetic attraction force acts upon said object and thereby fastens said fixing board onto said object,
    wherein said magnetic-attraction-force contact plate has a structure of at least two layers, namely
    a soft magnet plate and
    a ferromagnetic plate adhered onto said soft magnet plate, said plurality of grooves being formed in said ferromagnetic plate.

3. A fixing board as set forth in claim 2, wherein said plurality of grooves are formed in said magnetic-attraction-force contact plate in a radially-extending configuration.

4. A fixing board for an attraction-fastening-type freight-carrying device to be mounted on an object, comprising
    a magnetic-attraction-force contract plate, for generating a magnetic attraction force, said plate being fastenable onto said object, a film-like suction-cup placed throughout a circumferential section of said magnetic attraction force contact plate, and an air valve fitted onto said magnetic attraction force contact plate, and further comprising at least one of the following features:

(a) at least one groove formed in said said magnetic-attraction-force contact plate, thereby permitting it to deform when said magnetic attraction force acts upon said object and thereby fastens said fixing board onto said object; and (b) an air valve which is composed of an air hole made in said magnetic-attraction-force contact plate and a valve body permitting the opening and closing of said air hole, said valve body being operable in connection with a releasing handle provided on said magnetic-attraction-force contact plate.

5. A fixing as set forth in claim 4, wherein said film-like suction-cup has a plurality of tongue-shaped pieces placed along its circumference.

6. A fixing board as set forth in claim 5, wherein said magnetic attraction force contact plate has a thin-film sheet coated on its contact surface with said object.

7. A fixing board as set forth in claim 4, wherein said magnetic-attraction-force contact plate has a thin-film sheet coated on its contact surface with said object.

8. A fixing board for an attraction-fastening-type freight-carrying device to be mounted on an object, comprising a magnetic-attraction-force contact plate for generating a magnetic attraction force, to fasten said board onto said object, a film-like suction-cup located throughout a circumferential portion of said magnetic-attraction-force contact plate, and an air valve fitted onto said magnetic-attraction-force contact plate, wherein said film-like suction-cup has a plurality of tongue-shaped pieces placed along its circumference.

* * * * *